(12) United States Patent
Fisher et al.

(10) Patent No.: US 6,473,552 B1
(45) Date of Patent: Oct. 29, 2002

(54) APPARATUS AND METHOD FOR SIGNALING USING A LIGHT PIPE STYLUS

(75) Inventors: Mark Fisher, Highland Park; David Hixson, Evanston; Shu Kun Chang, Chicago, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/562,821

(22) Filed: May 1, 2000

(51) Int. Cl.$^7$ ................................. G02B 6/00
(52) U.S. Cl. ................. 385/133; 385/88; 385/147; 385/901
(58) Field of Search ................. 385/133, 901, 385/53, 88, 92, 147; 340/815.42; 362/551, 558, 559

(56) References Cited

U.S. PATENT DOCUMENTS

| | | | | |
|---|---|---|---|---|
| 5,001,455 A | * | 3/1991 | Starchevich | 340/332 |
| 5,151,679 A | | 9/1992 | Dimmick | 340/326 |
| 5,233,679 A | * | 8/1993 | Oyama | 385/146 |
| 5,369,262 A | * | 11/1994 | Dvorkis et al. | 235/472 |
| 5,622,423 A | * | 4/1997 | Lee | 362/186 |
| 5,654,529 A | * | 8/1997 | Yeung et al. | 178/18 |
| 5,678,914 A | * | 10/1997 | Dealey et al. | 362/32 |
| 5,760,754 A | * | 6/1998 | Amero, Jr. et al. | 345/82 |
| 5,791,772 A | | 8/1998 | Rickfelder et al. | 362/329 |
| 5,973,677 A | * | 10/1999 | Gibbons | 345/179 |
| 6,045,249 A | * | 4/2000 | Bellinghausen et al. | 362/555 |
| 6,095,673 A | * | 8/2000 | Goto et al. | 362/582 |
| 6,217,182 B1 | * | 4/2001 | Shepherd et al. | 362/23 |
| 6,264,376 B1 | * | 7/2001 | Savage, Jr. | 385/88 |
| 6,326,956 B1 | * | 12/2001 | Jaeger et al. | 345/179 |

* cited by examiner

Primary Examiner—Akm E. Ullah
Assistant Examiner—Jennifer Doan
(74) Attorney, Agent, or Firm—McDonnell Boehnen Hulbert & Berghoff

(57) ABSTRACT

Disclosed is a light pipe signaling device for signaling a user. A light pipe has a first end portion that fits into a receptacle. Both light pipe and receptacle are constructed using a transparent material. Light from a light source enters the receptacle and is transmitted to the light pipe. The light travels along a body of the light pipe to a second end portion. The second end portion is adapted to reflect or dissipate the light such that the user is able to see the light from a wide field of view. The light pipe is preferably removable and the receptacle is preferably incorporated into a device that activates the light source in order to alert the user.

24 Claims, 2 Drawing Sheets

FIG. 3
FIG. 4
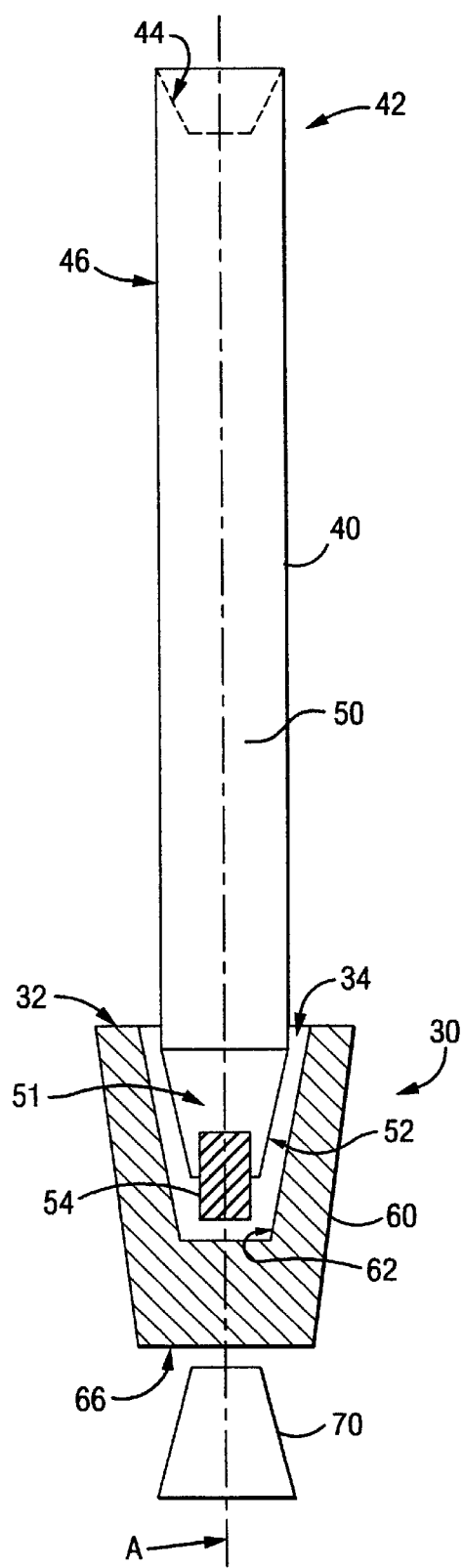
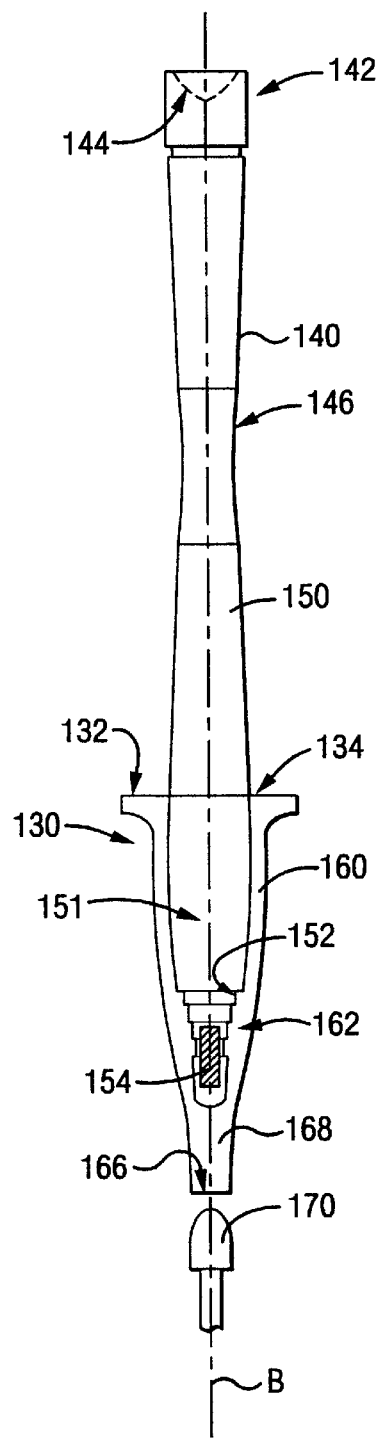

APPARATUS AND METHOD FOR SIGNALING USING A LIGHT PIPE STYLUS

FIELD OF THE INVENTION

The present invention relates to a device for signaling a user of a device.

DESCRIPTION OF THE RELATED ART

Communications devices, such as telephones, and data devices, such as personal computing devices, often include an indicator that alerts a user of the device that a message has been stored for the user. For example, some telephones, such as those found in hotels, have a red indicator light that flashes to notify a guest staying in the room corresponding to the phone that a message for the guest is waiting at the hotel desk or in the hotel's voice mail system. Likewise, an application program in a personal computer, such as an email program, will send a message or post an icon to a monitor screen of the personal computer to notify the user of the computer that an electronic mail message for the user has arrived and is stored in the user's inbox.

The present invention provides a system and method to notify the user of a communication device.

SUMMARY OF THE INVENTION

The present invention is directed toward a system and method for alerting a user of a device. An embodiment of a system for signaling a user, according to the present invention, includes a first transparent body having first and second end portions. The first end portion is adapted to receive a light beam and the first transparent body is adapted to transmit the light beam received at the first end portion to the second end portion. The second end portion is adapted to disperse the light beam. This embodiment also includes a second transparent body having a first surface, an opening, and a second surface interior to the opening. The opening is adapted to receive the first end portion of the first transparent body such that the second surface is adjacent the first end portion of the first transparent body. The second transparent body is adapted to transmit the light beam received through the first surface to the second surface such that the light beam is transmitted to the first transparent body.

An embodiment of a light pipe signaling apparatus, according to the present invention, includes an elongate transparent body having a lengthwise axis and a reflective sidewall and a first end portion of said body. The first end portion is disposed at a first end of the lengthwise axis and adapted to fit within an opening in a receptacle. The first end portion is further adapted to receive a light beam transmitted from a surface of the receptacle. The light pipe signaling apparatus also includes a second end portion of said body. The second end portion is disposed at a second end of the lengthwise axis opposing the first end of the lengthwise axis, and the second end portion is adapted to disperse the light beam received by the first end portion.

An embodiment of a method for signaling a user of a device, according to the present invention, includes the steps of providing a light source in the device, providing a transparent receptacle in the device adjacent to the light source, the receptacle having an opening, and providing a light pipe adapted to fit within the opening in the receptacle. The method then calls for inserting the light pipe into the opening in the receptacle, and activating the light source to signal the user of the device.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 3 is a cross-sectional diagram of another exemplary embodiment of a signaling system according to the present invention; and FIG. 4 is a front view of the light pipe stylus of FIG. 3.

DETAILED DESCRIPTION OF THE PREFERRED EMBODIMENT

The present invention is directed toward a system and method for alerting a user of a communication device.

Figure 1:
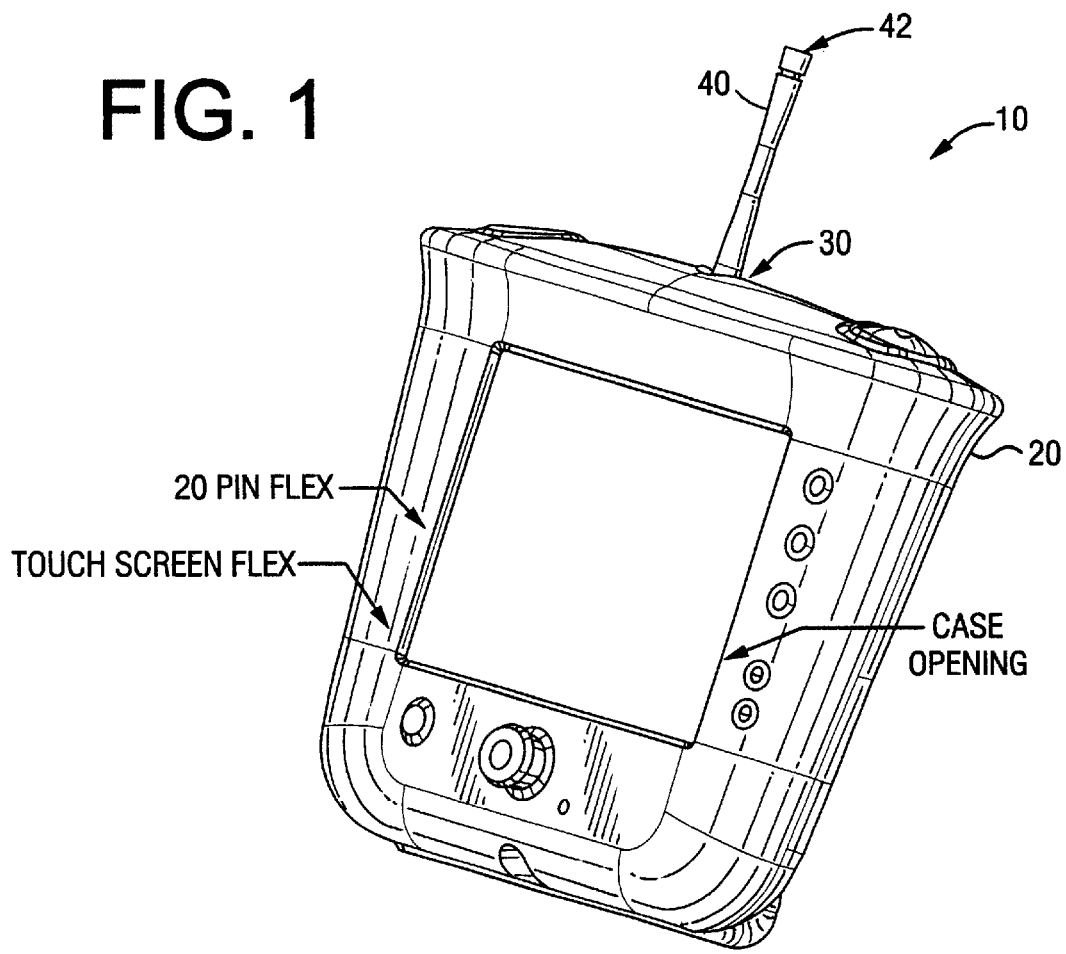
FIG. 1 is diagram of a device incorporating a signaling system according to one embodiment of the present invention.

FIG. 1 is a diagram of a system 10 that utilizes an embodiment of a light pipe stylus 40 according to the present invention. A communications device 20 has a receptacle 30 that receives light pipe stylus 40. When a message, or other notification, is waiting for a user of device 20, device 20 activates a light source adjacent receptacle 30, which transmits light into receptacle 30 for transmission to a first end of stylus 40 that is inserted into the receptacle. When stylus 40 is inserted into receptacle 30, light from the light source is transmitted through the transparent body of stylus 40 toward a light dispersing end 42 of the stylus. The light dispersing end 42 is configured to reflect the light such that the user will be readily able to observe the light signal transmitted by the light source.

Figure 2:
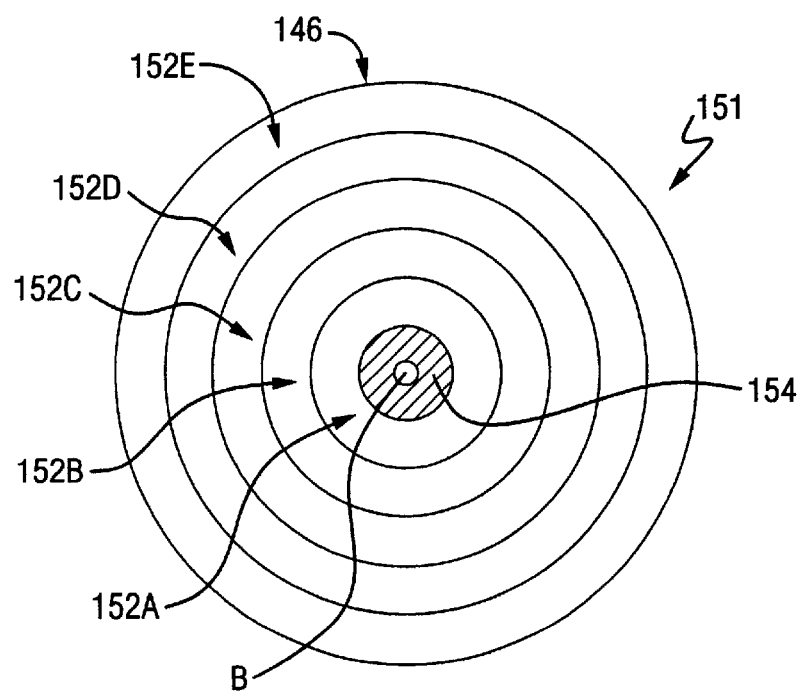
FIG. 2 is a cross-sectional diagram of one exemplary embodiment of a signaling system according to the present invention.

FIG. 2 is a cross sectional diagram illustrating one embodiment of stylus 40 and receptacle 30. Stylus 40 is composed of a transparent body 50 that functions as a light pipe. The shape of elongate stylus body 50 is preferably substantially cylindrical, but may take on a variety of alternative cross-sections, such as polygonal, and may include contours. Body 50 is composed of a transparent material, such as acrylic or glass, that will transmit light. The sidewall 46 of body 50 is preferably polished in order to reflect light traveling along the length of body 50, i.e. along lengthwise axis A.

At light dispersing end 42, a surface 44 is formed in body 50 to dissipate light traveling up through the body 50. In FIG. 2, surface 44 is shown as a concave frusto-conical surface, but alternative embodiments may take a variety of forms, including convex surfaces and hemispherical surfaces. Surface 44 is made translucent or frosted, such as by etching, such that light incident upon the surface is dispersed and thereby made visible through a wide viewing range.

A light receiving end 51 of body 50 is adapted to fit within an opening 34 in a body 60 of receptacle 30. In the embodiment of stylus 40 shown in FIG. 1, a light receiving surface 52 of light receiving end 51 is frusto-conical and, when stylus 40 is place within receptacle 30, lies substantially adjacent to a surface 62 of receptacle 30. Receptacle body 60 is composed of a transparent material, such as glass or acrylic, that transmits light from a light source 70 incident upon surface 66 of receptacle body 60. Light receiving end 51 optionally includes a stylus point 54 for use as a user input device for device 10.

Light source 70 is preferably a high intensity light source, such as a high intensity light emitting diode (LED), that produces a beam of light focused along axis A. At least a portion of the beam of light generated by light source 70 enters body 60 via surface 66, which should be configured to have an angle of incidence of the light beam on surface 66 of substantially 90° in order to obtain a high level of light transmission into body 60. A portion of the light entering receptacle body 60 will be emitted through surface 62 into stylus body 50 via surface 52. Optionally, an emitting surface 32 of receptacle 30 is frosted, by etching for example, such that a portion of the light traveling within receptacle body 60 is incident upon surface 32 and is dispersed so as to be visible to a user of device 10 even when stylus 40 is not inserted into receptacle 30. Emitting surface 32 is substantially perpendicular to axis A so that a portion of the light received at surface 66 and transmitted by receptacle body 60 is incident upon emitting surface 32.

The transmitted light received in stylus 40 from receptacle 30 through surface 52 travels through the stylus body 50 and is incident upon surface 44. As noted above, surface 44 is adapted to reflect or diffuse the light transmitted through the body 50 in a manner that is readily observable to users of the device 10. Generally, surface 44 includes contours that are oblique to axis A so that light transmitted through body 50 along axis A is dispersed away from axis A in order to obtain a wide viewing angle for the light. The surface 44 shown in FIG. 2 is frusto-conical and etched to obtain a frosted surface that will dissipate light in a substantially uniform pattern such that a user can observe the light reflected by surface 44 from a 360° radius around the light pipe stylus 40. Alternatively, surface 44 can be treated such that it acts as a mirror that reflects substantially all of the transmitted light incident upon the surface. Further, a portion of the outside surface 46 of the stylus 40 that is adjacent the surface 44 can be treated, such as by etching to obtain a frosted surface, to increase light diffusion.

FIG. 3 illustrates another embodiment of a light pipe stylus 140 and receptacle 130 according to the present invention for use with a device, such as device 10 of FIG. 1. Light pipe stylus 140 is composed of a transparent body 150 that functions as a light pipe. The shape of body 150 is contoured and has shape that is substantially a hyperboloid of one sheet, where cross-sections of body 150 taken perpendicular to axis B are substantially circular, but may have different values for the radius. Body 150 is composed of a transparent material, such as acrylic or glass, that will transmit light. The sidewall 146 of body 150 is preferably polished in order to reflect light traveling along the length of body 150, i.e. along lengthwise axis B.

At light dispersing end 142 of stylus 140, a surface 144 is formed in body 150 to dissipate light traveling up through the body 150. In FIG. 3, surface 144 is shown as a concave surface. Surface 144 can take on a variety of shapes, such as conical, hemispherical, and may take on a variety of forms, including a convex surface. The shape and character of surface 144 is selected to dissipate incident light in order to obtain a wide viewing angle for a user of device 10.

A light receiving end 151 of body 150 is adapted to fit within an opening 134 in a body 160 of receptacle 130. Light receiving end 151 and opening 134 are constructed such that, when stylus 140 is inserted into opening 134 in receptacle body 160, an axis of body 150, which intersects light receiving end 151 and light dispersing end 142, is substantially aligned with an axis of receptacle body 160 that intersects opening 134 and light receiving surface 166.

In the embodiment of stylus 140 shown in FIG. 3, a light receiving surface 152 of light receiving end 151 includes a series of concentric step contours that interface with a corresponding series of step contours in surface 162 of receptacle 130. When stylus 140 is placed within receptacle 130, the steps of surfaces 152 and 162 substantially interlock bringing the axes of the receptacle body 160 and body 150 into alignment along axis B. Receptacle body 160 is composed of a transparent material, such as glass or acrylic, that transmits light from a light source 170 incident upon surface 166 of receptacle body 160. The corresponding steps of surfaces 152 and 162 are parallel to one another such that light transmitted from surface 162 has an angle of incidence upon surface 152 of substantially 90°.

Similar to light source 70 of FIG. 2, light source 170 is preferably a high intensity light source, such as a high intensity light emitting diode (LED), that produces a beam of light focused along axis B. At least a portion of the beam of light generated by light source 170 enters body 160 via surface 166, which should be configured to have an angle of incidence of the light beam on surface 166 of substantially 90° in order to obtain a high level of light transmission into receptacle body 160. Receptacle body 160 includes an elongate portion 168 interposed surfaces 162 and 166. The substantially cylindrical shape of elongate portion 168 functions to columnate, along axis B, the light transmitted through surface 166. The columnated light transmitted through elongate portion 168 will be emitted through surface 162 into stylus body 150 via surface 152. The columnating effect of elongate portion 168 combined with the steps of surfaces 152 and 162 contribute to improved transmission of light from light source 170 along axis B through receptacle body 160 into stylus body 150.

The transmitted light received in stylus 140 from receptacle 130 through surface 152 travels through the stylus body 150 and is incident upon surface 144. As noted above and similar to surface 44 of FIG. 2, surface 144 is adapted to reflect or diffuse the light transmitted through the body 150 in a manner that is readily observable to users of the device 10. Also, as with receptacle 30, receptacle 130 may optionally include an emitting surface 132 that is etched or similarly treated such that a portion of the light traveling within receptacle body 160 is incident upon surface 132 and is dissipated so as to be visible to a user of device 10 even when stylus 140 is not inserted into receptacle 130.

FIG. 4 is a diagram illustrating an embodiment of light receiving end 151 of light pipe stylus 140 viewed along axis B of FIG. 3. Disposed between stylus point 154 and sidewall 146 are step contours 152A–E. Each of step contours 152A–E is composed of a planar surface that is perpendicular to axis B. The light transmitting surface 162 interior to opening 134 of receptacle 130 has corresponding step contours. Each of the step contours of surface 162 also has a planar surface that is perpendicular to axis B. Thus, when stylus 140 is place into opening 134 of receptacle 130, the planar surfaces of step contours 152A–E are substantially adjacent and facing the corresponding contours of surface 162. The columnated light transmitted from surface 166 through elongate portion 168 is transmitted through the planar surfaces of the step contours of surface 162 to the may be further transmitted through stylus body 150 along axis B to light dispersing end 142.

While the invention has been described in conjunction with presently preferred embodiments of the invention, persons of skill in the art will appreciate that variations may be made without departure from the scope and spirit of the invention.

This true scope and spirit is defined by the appended claims, interpreted in light of the foregoing.

We claim:

1. A system for signaling a user, the system comprising:
   a first transparent body having first and second end portions, the first end portion being adapted to receive a light beam, the first transparent body being adapted to transmit the light beam received at the first end portion to the second end portion, and the second end portion being adapted to disperse the light beam; and
   a second transparent body having a first surface, an opening, and a second surface interior to the opening, the opening being adapted to receive the first end portion of the first transparent body such that the second surface is adjacent the first end portion of the first transparent body, the second transparent body being adapted to transmit the light beam received through the first surface to the second surface such that the light beam is transmitted to the first transparent body.

2. The system of claim 1, wherein:
   the first and second end portions of the first transparent body each intersect an axis of the first transparent body and where the second end portion includes a reflecting surface adapted to reflect light transmitted along the axis of the second transparent body and incident upon the reflecting surface;
   the first surface of the second transparent body intersects an axis of the second transparent body and the opening of the second transparent body also intersects the axis of the first transparent body; and
   where the first and second transparent bodies are adapted such that the axes of the first and second transparent bodies are substantially aligned when the first end portion of the first transparent body is inserted into the opening of the second transparent body.

3. The system of claim 2, where:
   the second surface of the second transparent body further includes a first planar surface that is perpendicular to the axis of the second transparent body; and
   a surface of the first end portion of the first transparent body further includes a second planar surface that is perpendicular to the axis of the first transparent body, such that the first and second planar are substantially adjacent to one another when the first transparent body is inserted into the opening of the second transparent body.

4. The system of claim 1, where the first end portion of the first transparent body includes a surface that intersects the axis of the first transparent body at an oblique angle.

5. The system of claim 4, where the surface of the first end portion is etched.

6. The system of claim 4, where the surface of the first end portion is one of concave and convex.

7. The system of claim 1, where the second transparent body includes a third surface that is substantially perpendicular to the axis of the second transparent body and external to the opening and adapted to receive a portion of the light beam received at the first surface of the second transparent body, the third surface being adapted to disperse the portion of the light beam.

8. The system of claim 7, where the third surface of the second transparent body is etched.

9. The system of claim 1, where the first and second transparent bodies are further comprised of one of glass and acrylic.

10. The system of claim 1, where the first end portion of the first transparent body includes a stylus point.

11. The system of claim 1, where the second transparent body further includes an elongate portion interposed the first and second surfaces.

12. A light pipe signaling stylus apparatus, the apparatus comprising:
    an elongate transparent body having a lengthwise axis and a reflective sidewall;
    a first end portion of said body, the first end portion being disposed at a first end of the lengthwise axis and adapted to fit within an opening in a transparent receptacle, the first end portion being further adapted to receive a light beam transmitted from a surface of the transparent receptacle; and
    a second end portion of said body, the second end portion being disposed at a second end of the lengthwise axis opposing the first end of the lengthwise axis, the second end portion being adapted to disperse the light beam received by the first end portion.

13. The apparatus of claim 12, where the second end portion includes a reflecting surface adapted to reflect light transmitted along the lengthwise axis of the elongate transparent body and incident upon the reflecting surface.

14. The apparatus of claim 13, where reflecting surface intersects the lengthwise axis at an oblique angle.

15. The apparatus of claim 13, where the reflecting surface is frosted.

16. The apparatus of claim 13, where the reflecting surface is one of convex and concave.

17. The apparatus of claim 12, where the first end portion includes a planar surface that is substantially perpendicular to the lengthwise access and is adapted to mate with a corresponding planar surface of the transparent receptacle when the first end portion is fitted into the opening of the transparent receptacle.

18. The apparatus of claim 12, where the elongate transparent body is further comprised of one of glass and acrylic.

19. The apparatus of claim 18, further comprising a stylus point disposed within the first end portion.

20. A method for signaling a user of a device, the method comprising the steps of:
    providing a light source in the device;
    providing a transparent receptacle in the device adjacent to the light source, the receptacle having an opening;
    providing a light pipe adapted to fit within the opening in the receptacle;
    inserting the light pipe into the opening in the receptacle; and
    activating the light source to signal the user of the device.

21. The method of claim 20, the method further comprising the step of providing corresponding surfaces on both a first end of the light pipe that fits into the receptacle and a surface within the opening in the receptacle.

22. The method of claim 21, where the step of providing corresponding surfaces further includes orienting the surfaces relative to a lengthwise axis of the light pipe to maximize transmission of light from the receptacle to the light pipe.

23. The method of claim 22, the method further comprising the step of columnating light received from the light source along an axis of the receptacle configured to align with the lengthwise axis of the light pipe.

24. The method of claim 21, the method further comprising the step of disposing a light dispersing surface at a second end of the light pipe.

* * * * *